Sept. 2, 1924.
1,507,032
F. A. SCHMITZ
PROCESS OF FABRICATING FIRE RESISTING SAFES
Filed March 31, 1923      5 Sheets-Sheet 1
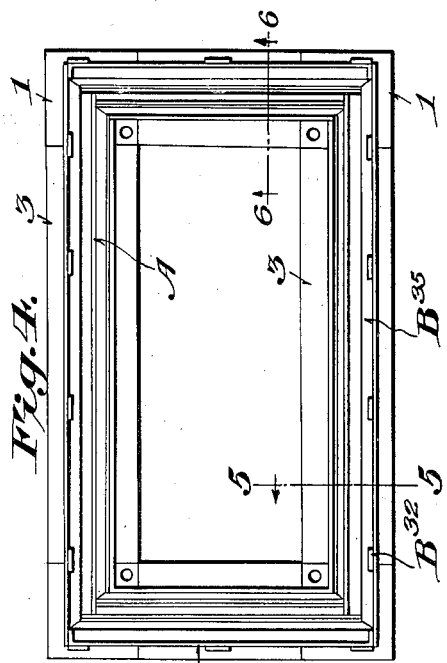
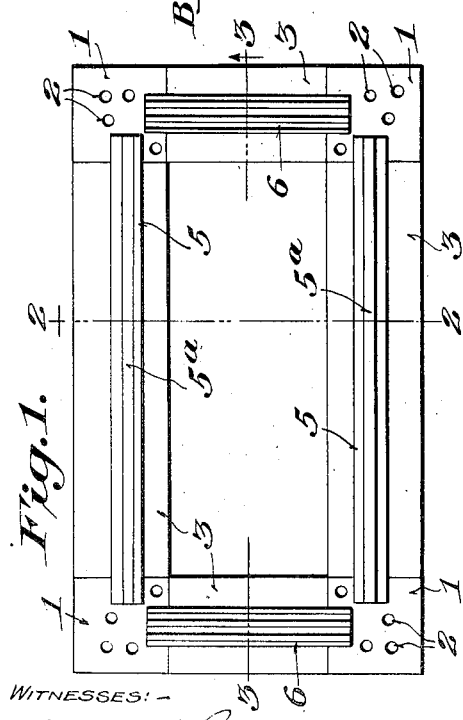
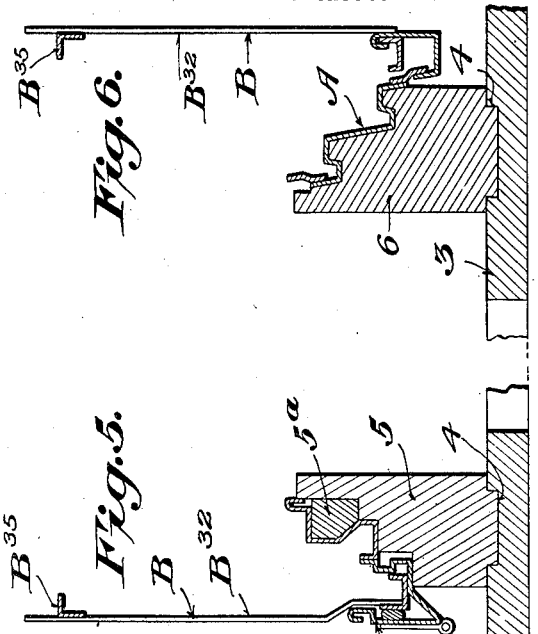
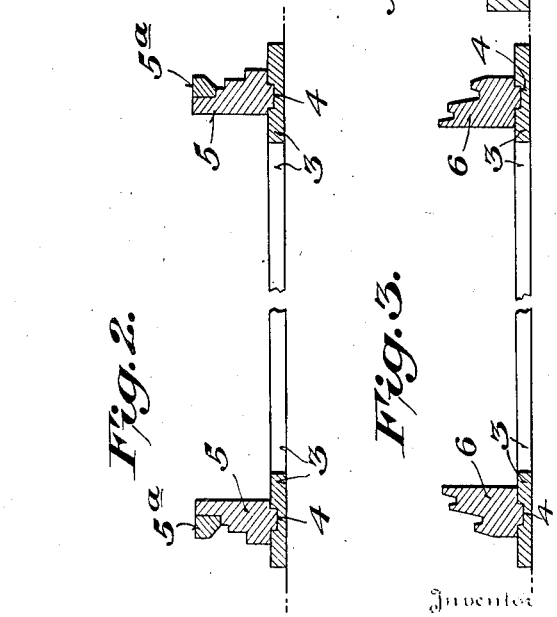
Inventor
Fred A. Schmitz,

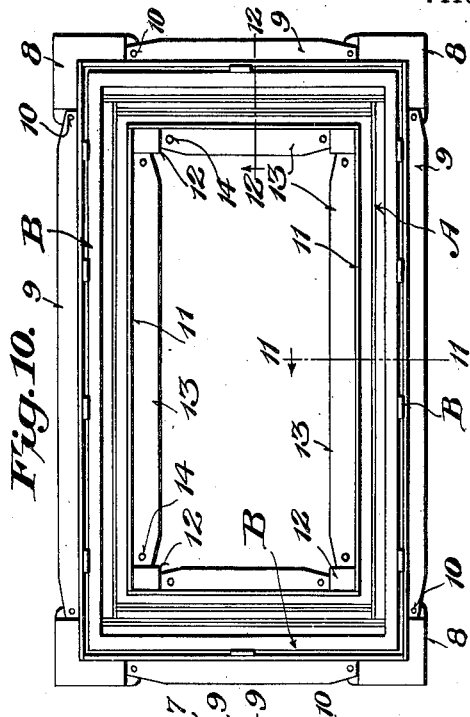

Sept. 2, 1924.　　　　　　　　　　　　　　　　　1,507,032
F. A. SCHMITZ
PROCESS OF FABRICATING FIRE RESISTING SAFES
Filed March 31, 1923　　5 Sheets-Sheet 3
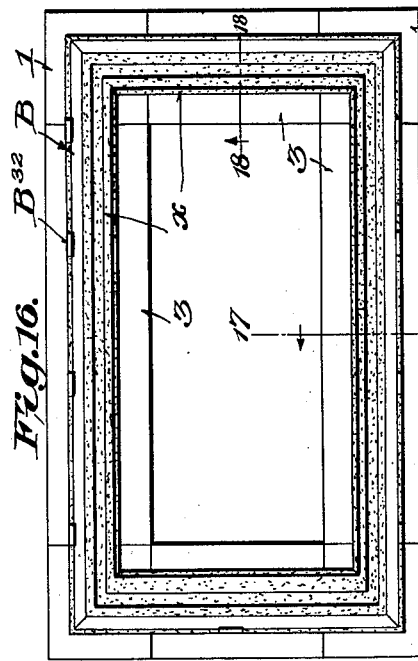
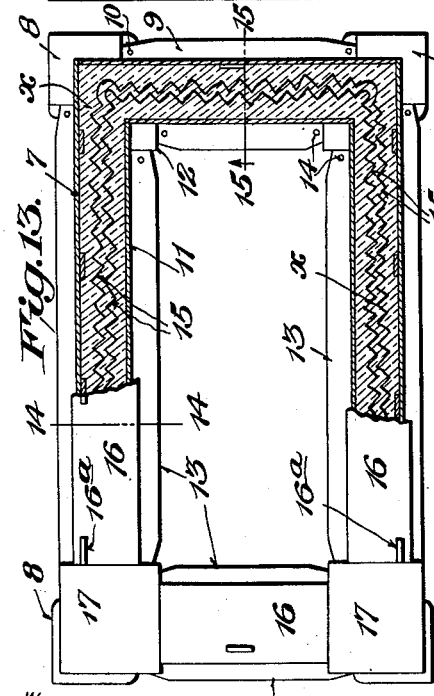
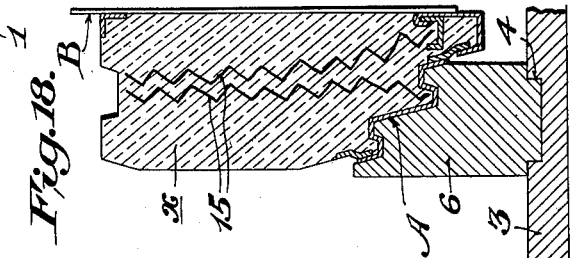
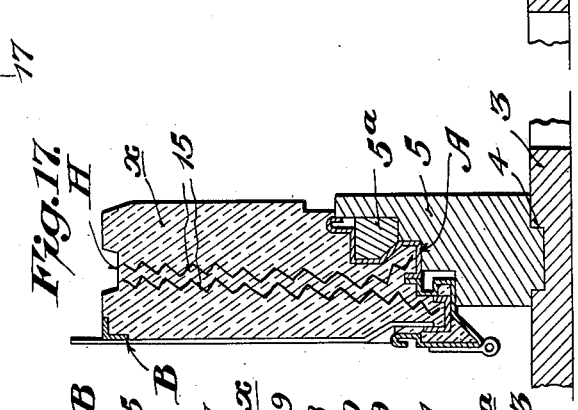
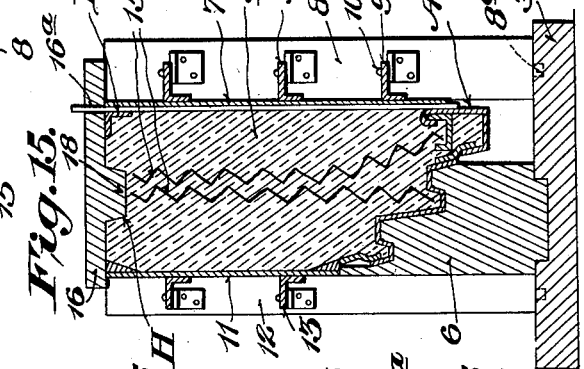
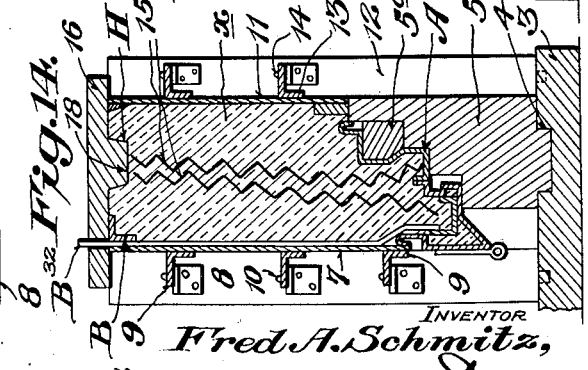
INVENTOR
Fred A. Schmitz,

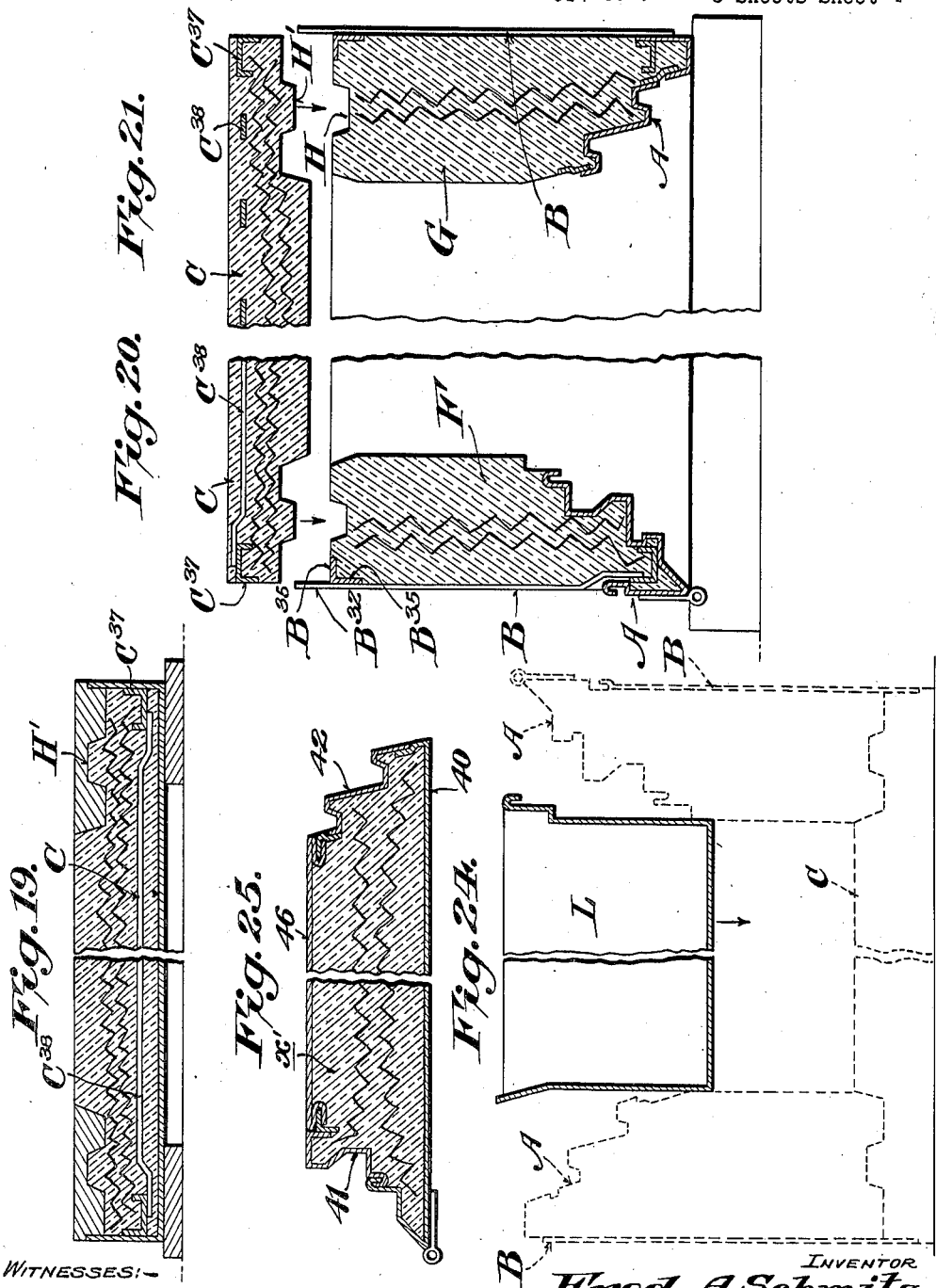

Sept. 2, 1924.
F. A. SCHMITZ
1,507,032
PROCESS OF FABRICATING FIRE RESISTING SAFES
Filed March 31, 1923  5 Sheets-Sheet 5
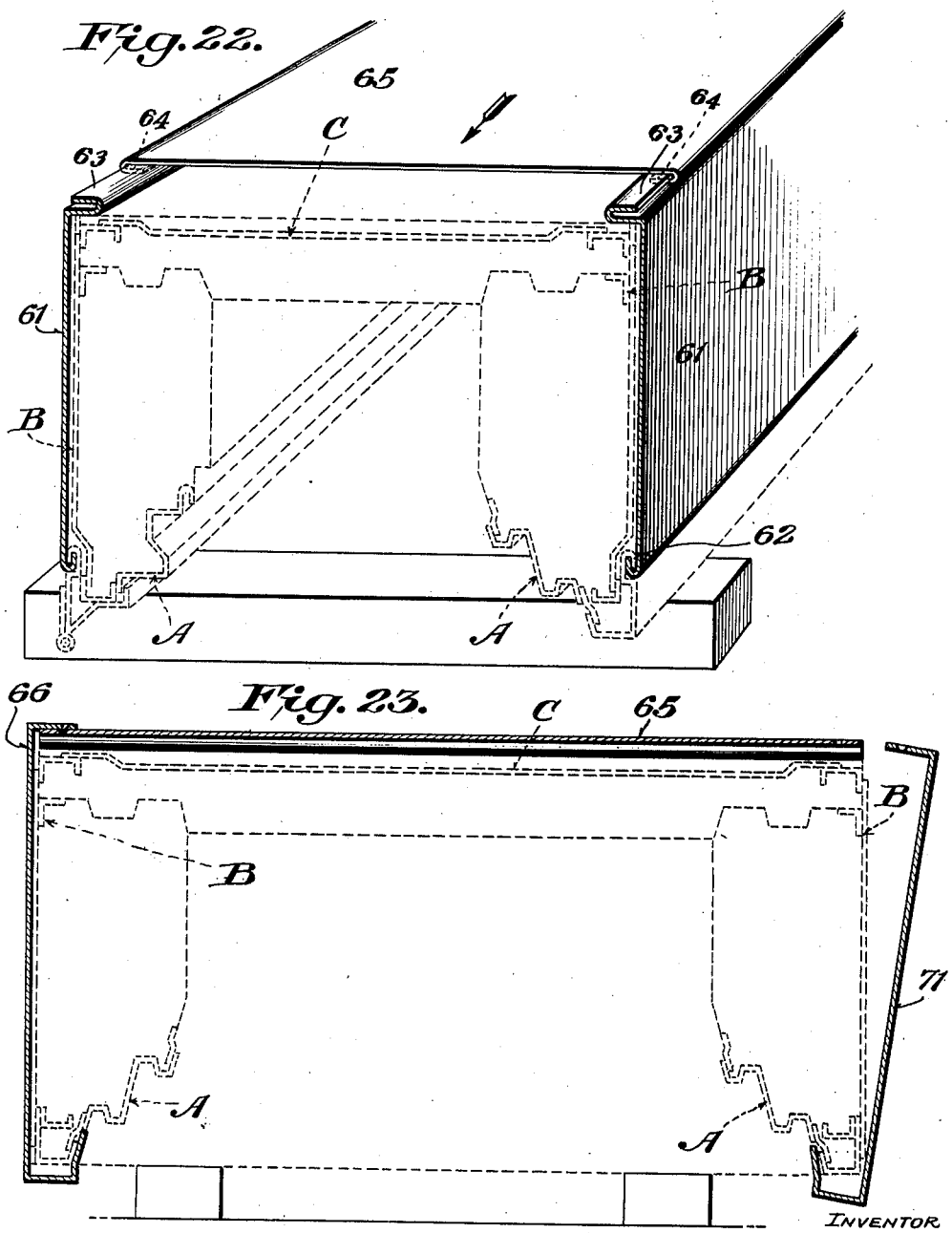

Patented Sept. 2, 1924.

1,507,032

UNITED STATES PATENT OFFICE.

FRED A. SCHMITZ, OF YOUNGSTOWN, OHIO, ASSIGNOR TO THE GENERAL FIREPROOFING COMPANY, OF YOUNGSTOWN, OHIO, A CORPORATION OF OHIO.

PROCESS OF FABRICATING FIRE-RESISTING SAFES.

Application filed March 31, 1923. Serial No. 629,192.

*To all whom it may concern:*

Be it known that I, FRED A. SCHMITZ, a citizen of the United States, residing at Youngstown, in the county of Mahoning and State of Ohio, have invented certain new and useful Improvements in Processes of Fabricating Fire-Resisting Safes, of which the following is a specification.

This invention relates to a novel process of fabricating fire resisting safes of the type used in offices and the like for preserving records, documents and other valuables from loss by fire.

In its primary aspect the present invention contemplates a novel method or process wherein the various elements included in the complete safe organization are assembled in a practical, feasible, and expeditious way to provide a fire proof safe of the general character set forth in my co-pending application Serial No. 601,734 filed November 18, 1922.

One of the important objects of the present process is to form a hollow shell of insulating material which is open at opposite sides and built around and about a skeleton reinforcing frame which has been previously fabricated with a view to meeting other requirements as to strength and the exacting conditions imposed by underwriter's rules. After the hollow reinforced shell is made, the back panel is formed and then set into place in a specially formed seat at one of the sides of the hollow shell, while the door or doors are also molded in their frames or cases, and, after suitable treatment to be hereinafter described, are subsequently hung in position on the shell to provide the closure for the safe.

A further object of the invention is to provide a process wherein one of the members of the safe is used as a part of the mold, said member being the door frame, this insuring in the completed article a door opening having true corner angles and an accurate seat for the doors.

Accordingly, the present invention contemplates a method of producing a safe having a monolithic body structure, the walls of which are reinforced by a framing and netting; and one in which the walls are dried and seasoned in such a way as to be free from internal stresses and free from cracks and flaws caused by internal stresses.

Various forms of apparatus may be utilized in carrying out the process but certain practical embodiments are shown in the accompanying drawings in which Figure 1 is a plan view of the foundation form of the mold.

Figure 2 is a transverse sectional view taken on the line 2—2 of Figure 1.

Figure 3 is a longitudinal sectional view taken on the line 3—3 of Figure 1.

Figure 4 is a plan view showing the metallic door frame laid in position on the foundation form.

Figure 5 is a detail sectional view taken on the line 5—5 of Figure 4 showing the manner in which the side of the door frame is positioned on the foundation mold.

Figure 6 is a detail cross sectional view taken on the line 6—6 of Figure 4 showing how the bottom of the door frame is positioned on the foundation mold.

Figure 7 is a plan view showing how the outside mold form is assembled about and above the metallic door frame.

Figures 8 and 9 are detail sectional views taken on the lines 8—8 and 9—9 respectively of Figure 7.

Figure 10 is a plan view illustrating the step of assembling the inside mold about and above the door frame.

Figures 11 and 12 are detail sectional views taken on the lines 11—11 and 12—12 respectively of Figure 10.

Figure 13 is a detail plan view, partly in section, illustrating the manner in which the plastic insulation material is poured between the inner and outer molds.

Figures 14 and 15 are detail sectional views taken on the lines 14—14 and 15—15 of Figure 13 and respectively showing a side and an end of the monolithic open frame and the manner in which the seat is formed at the back of the monolith for receiving the back panel.

Figure 16 is a plan view of the completed rectangular shell with the inner and outer mold members removed.

Figures 17 and 18 are detail sectional views taken on the lines 17—17 and 18—18 of Figure 16.

Figure 19 is a detail view illustrating the manner of forming the back panel.

Figure 20 is a detail view illustrating the manner of applying the back panel to the seat in the side of the monolithic shell.

Figure 21 is a detail view similar to Figure 20 showing the bottom of the hollow shell.

Figure 22 is a detail perspective view illustrating the manner in which the outside finishing plates are applied to the sides and back of the insulated body.

Figure 23 is a view illustrating the manner in which the top and bottom sheets are fitted to the body.

Figure 24 illustrates the manner in which the inner metallic lining is fitted into place.

Figure 25 is a view illustrating the manner in which the door is formed.

Similar reference characters designate corresponding parts throughout the several figures of the drawings. In that connection it may be noted that the letters and letters with exponents refer to similar parts in my co-pending application Serial No. 601,734 previously referred to, while the numerals refer to the parts of the mold.

The safe which is formed by the present process essentially includes in its organization a rectangular door frame of stepped cross section and designated generally as A; a skeleton reinforcing framework B which is connected at its front end with the metallic door frame A and provided at its rear end with a reinforcing angle $B^{35}$ which forms a part of the seat H for receiving the interlocking portions H' of the back panel C.

In the above connection it may be pointed out, more especially with reference to Figures 20 and 21 that the reinforcing framework $C^{37}$ of the back panel C is adapted to be connected with the ends of the reinforcing elements $B^{32}$ which project beyond the member $B^{35}$. When the hollow monolithic body is formed in the door frame A and about the skeleton frame B, the sides F—F, top G and bottom G' together with the back panel C form the complete safe except for the doors D which are formed in the manner hereinafter referred to and hung on the door frame A as fully shown and described in my aforesaid co-pending application.

Referring briefly to the general steps of the process preliminary to proceeding with a more detail description thereof, and the manner in which the molds therefore are constructed, it may be pointed out that the rectangular door frame A and the skeleton reinforcing frame B are first fabricated and permanently united, and together constitute a part of the mold.

In building up the mold, first the part A—B is positioned upon a suitable foundation form, outside and inside mold walls or members are assembled about the rectangular frame to form a hollow rectangle having two sides and two ends, leaving the remaining two opposite sides open. Suitable reinforcements such as wire mesh, may be placed within the mold members as thus assembled, and the insulating material is then poured, the seat for the back panel C being formed as a part of this operation.

The back panel C is also formed in its mold and after the hollow rectangular body and the back have dried sufficiently to permit the removal of their forms, both the back panel and the hollow rectangular body are subjected to a drying operation.

The back slab or panel and the hollow rectangular body are then united, and the outside finishing sheets and doors D are subsequently placed in position; also the inside finishing shell is subsequently put in place.

Among the features which are important in the present process are the building up of the rectangular door frame A and a welded or riveted skeleton structure B about which may be placed a net work of reinforcement such as wire mesh prior to the pouring of a plastic cementitious substance in the mold around and about the skeleton frame B and into the hollow door frame A. After the hollow monolithic body has been thus formed, a separately formed and dried back panel C is secured to the hollow rectangular body by welding, riveting or otherwise securing the reinforcement thereof to the reinforcement B of the body, and also providing a proper seal between the back and the body where they interfit.

Referring now to the drawings which illustrate one form of apparatus which may be employed for carrying the process into effect it will be observed that the mold proper comprises a foundation form which includes the corner plates 1 having openings 2 and the intermediate base plates 3 all of which are provided with channels 4 for receiving the blocks 5 which constitute the foundation for the sides of the safe and the block 6 which constitutes the foundation for the ends of the safe. In connection with the side blocks 5—5 it is pointed out that a loose or removable mold piece $5^a$ must be used to allow the cast to be removed from the bases as will be readily apparent from an inspection of Figure 2.

Figure 4 of the drawings shows the rectangular metallic door frame A of stepped cross section laid upon the foundation blocks 5 and 6, together with the thin upstanding skeleton reinforcing frame B connected with the door frame A, this feature being more apparent from Figures 5 and 6.

Having thus positioned the door frame A and skeleton frame B upon the proper mold supports, the next step involves the building up of the temporary outside mold members as shown in Figures 7, 8 and 9. From these figures it will be seen that the skeleton frame B and outside portions of the door frame A are surrounded by the walls 7 which constitute the outer mold member and are held in place by the vertical corner strips 8 and the angle strips 9 which interlock with the dowel pins carried by the vertical corner posts 8. The said corner posts 8 are provided at their lower ends with suitable dowel pins $8^a$ for removably fitting in the openings 2 of the corner plates 1, previously referred to.

After the outer part 7 of the mold is constructed, the inner part comprising the walls 11 is assembled as shown in Figures 10, 11 and 12. Said walls are held in position by the vertical corner posts 12 and the supporting angles 13 which are interlocked with dowel pins 14 carried by the inner corner posts 12. Therefore, as shown in Figures 10, 11 and 12 when the inner mold part is completed, the same is properly spaced from the outer walls 7 to provide the desired wall thickness of the safe.

After the mold is thus completed suitable reinforcement is placed about the frame B and then the mold cavity is filled with a plastic filling material such as cement or an equivalent fairly rapid setting composition $x$. The said reinforcement may be expanded metal or other wire mesh, or any other suitable reinforcing material.

As will also be observed from Figures 13, 14 and 15 cap plates 16 and 17 are applied to the top of the mold, while the material is still plastic so that the offset rib or tenon 18 will be embedded in the plastic composition to provide a portion of the seat H in the finished monolithic body. In the case of the plates 16 it will be observed that the same are provided with openings $16^a$ for permitting the ends of the members $B^{32}$ of the skeleton frame B to project therethrough.

After the platstic composition $x$ has sufficiently set, the outside mold members or walls 7; the inside mold members or walls 11, and the top mold plates 16 and 17 are removed as shown in Figures 16, 17 and 18. At this stage of manufacture the molded material is very weak and the setting is still in process. The material is wet and soggy but is dry as compared with the fluid state in which it was poured into the mold, owing to some of the water having been absorbed as the water of crystallization. After the setting is complete it is found that there is an excess of moisture in the cast material. At this point the material is allowed to have even more water if it is required for proper crystallization, and after the setting is satisfactorily completed it becomes necessary to dry the plastic body, and this may be done, to some extent at least in the open atmosphere. However, owing to the great thickness of the body it is desirable that drying be accomplished artificially, and in order to hasten the process, higher temperatures than that of the natural atmosphere are applied. Therefore, the molded shape is preferably placed in an oven which either uses pre-heated air or which is provided with steam coils or electric heating coils.

The back panel or slab C may be formed in a suitable mold as shown in Figure 19, and envelopes and encases the reinforcing members $C^{37}$ and $C^{38}$. Also, as shown, the cementitous portion of the panel is formed with the seat portion H', and when sufficiently set is subjected to the same drying operation as the body. When dry the back panel C and the monolithic body $x$ are united by placing a plastic cement in the seat which forms the joint between the two, while at the same time the metallic reinforcing member $C^{37}$ is rigidly connected to the reinforcing elements $B^{32}$ of the frame B.

When completing the safe structure the outside sheets 61 are interlocked at their front edges as at 62 with the door frame A, while the flange portion 63 at the rear edge thereof slidably receives the locking flange portion 64 of the back section 65 as shown in Figure 22.

From Figure 23 it will be observed that the top or cap plate 66 and the bottom or base plate 71 are fitted into position in the manner shown and properly united to the other outside casing sheets as described in my previous application.

In Figure 24 it will be observed that the partly completed safe may be laid on its back to receive the assembled inner lining designated generally as L, the front edges thereof being interlocked with the door frame A and secured thereto in any desired manner.

Figure 25 illustrates the manner in which the door D is formed. The outside plate 40 and the edge plates 41 and 42 are properly assembled to form the mold into which the plastic composition $x'$ is poured. After the plastic composition is properly set and dried the rear facing plate 46 is fitted into position and the door is then completed ready for hanging on the door frame A. In connection with the formation of the door it will of course be understood that the locking mechanism is assembled in the desired manner before the plastic composition is poured.

Briefly summarizing the steps of the present process it should be noted that a distinctive part thereof resides in molding the cementitious body on top of the inside part of the door frame and about the fabricated reinforcing frame while the latter is in an upstanding position, and the door frame occupying a horizontal position at the same time giving form and shape to such parts of the cementitious body as cooperate with the back and with the metal casing plates which are subsequently fitted in position. When the mold is made up with the door frame resting on the mold base, and the inside and outside temporary mold walls properly positioned, the cementitious material in its liquid state is poured between the mold walls on top of the door frame and about the upstanding reinforcing frame and brought level with or substantially level with the top of the mold walls to receive the cap plates which also constitutes a part of the mold. The mold as thus constructed remains intact until the cementitious material has become quite considerably set and quite dry, thus permitting the stripping off of the inside and outside mold walls and the troweling and trimming of the partially set body. Then the mold is disassembled by stripping the inside and outside mold walls, and, by means of a suitable hoist and tackle, the door frame with the molded body on top of it is hoisted and run to a position where the back can be fitted in place and the structure preferably placed in an oven or kiln where it remains for a considerable length of time until the cement body is hard, thoroughly set, and quite thoroughly dry.

Atmospheric drying may suffice with the application of a small amount of heat, but as this is slow and requires much floor space, I prefer to use a drying kiln in which I can regulate the temperature and humidity of the air. The body with its frame, the doors with their frames and the back with its frame are all made in substantially the same manner as described above for the body.

After the body, the doors and the back are made, and they are then ready for assembly.

The assembly consists in bringing the outside and inside covering sheets into position, mounting the doors, locks, casters, handles, hinge pins and otherwise finishing. Other steps in finishing consists in putting in shelving, trays and other interior finish and in painting.

I claim:—

1. A process for making fireproof safes which consists first in preliminarily fabricating the door frame with a reinforcing frame, then forming a mold with said door frame as its bottom and subsequently placing a cementitious substance in the mold on top of the door frame and about the reinforcing frame.

2. A process for making fireproof safes which consists first in fabricating the door frame, then forming a mold with the door frame as its bottom and subsequently casting a cementitious body onto the door frame within the mold.

3. The process of making a fireproof safe which consists first in fabricating the door frame with a reinforcing frame extended from one side thereof, molding a cementitious body onto the door frame and about said reinforcing frame, separately casting a back with metal reinforcement and subsequently uniting the metal of the back to the metal of said reinforcing frame.

4. The process of making a fireproof safe which consists first in fabricating the door frame with an offstanding metal reinforcing frame, forming a mold with the door frame as the bottom of the mold and said reinforcing frame between the mold walls, then pouring the cementitious substance into the mold on top of the door frame and about said reinforcing frame allowing said cementitious substance to partially set, then stripping the mold walls from the set material and subsequently subjecting the molded article to a drying temperature.

5. A process of fabricating a fire resisting safe which consists in placing a framed structure within a mold, pouring a plastic cementitious substance into the mold about the frame, allowing the cementitious substance to set, disassembling the mold, drying the cementitious substance, separately forming a door and back panel and assembling the parts.

6. A process for fabricating fireproof safes which consists in fabricating a reinforcing frame, molding a cementitious composition about said frame, forming a seat at one side of said frame, separately forming a back panel having a portion to interlock with said seat, and subsequently uniting the back panel with the body at the seat.

7. A process for fabricating fireproof safes which consists in forming a hollow monolithic body open at opposite ends, separately forming a back panel, and subsequently uniting the back panel with the body.

8. A process of fabricating fireproof safes which consists in fabricating a skeleton frame, forming a hollow monolithic body about said frame, separately forming a back panel, and subsequently uniting the back panel to one end of the said hollow monolithic body.

In testimony whereof he hereunto affixes his signature in the presence of two witnesses.

FRED A. SCHMITZ.

Witnesses:
E. E. WALTERS,
J. W. REID.